Patented Oct. 17, 1950

2,525,770

UNITED STATES PATENT OFFICE 2,525,770

BATHS FOR STRIPPING VAT-DYED TEXTILE MATERIALS AND AGENTS USEFUL THEREIN

Alton A. Cook, Glen Ridge, and Ira Sapers, Newark, N. J., assignors to Arkansas Company, Inc., Newark, N. J., a corporation of New York No Drawing. Application May 17, 1946, Serial No. 670,549

2 Claims. (Cl. 8—102)

The present invention relates to baths for stripping vat-dyed cotton and rayon fabrics, yarns and other textile materials and it particularly relates to agents useful in such baths.

It is among the objects of the present invention to provide improved stripping baths for stripping vat dyed cotton and rayon fabrics, yarns and other textile materials and improved stripping agents for use in such baths, in which the vat dyes after stripping will be held in the baths and will be prevented from re-depositing upon the goods.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

It has now been found that superior stripping aids for vat dye stripping baths, which aids are particularly useful in stripping vat dyestuffs of the anthraquinone class, may be prepared by condensing non-hydroxylated polyamines having 4 to 10 carbon atoms and 3 to 6 nitrogen atoms with high molecular weight fatty acids containing 12 to 32 carbon atoms. Generally the polyamine should be in excess of equi-molar proportions and the condensation is achieved by heating the mixture to 160 to 230° C. for 1 hour to 3 hours, followed by cooling rapidly to between 90 to 100° C.

Among the polyamines which may be utilized are:

| Di-ethylene | Triamine |
| Tri-ethylene | Tetramine |
| Tetra-ethylene | Pentamine |
| Penta-ethylene | Hexamine |

Ethylene diamine, aminoethyl ethanol amine and propylene diamine are not satisfactory.

The preferred fatty acids are myristic, palmitic and stearic. Oleic, ricinoleic, and linoleic acids are not desirably used. The fatty acids which are used may be the commercial grades or the fatty acid mixtures may be derived by hydrolysis from palm oil, tallow, Japan wax, and hydrogenated glycerides. If desired mono-, di-, or tri-glycerides may be used directly in condensation reaction.

The resultant products are amber to brownish colored waxy solids of strongly alkaline reaction and may be neutralized with water soluble organic acids, such as formic acid, acetic acid, or lactic acid. If such acids are employed in the preparation of the compound, the original base is reformed when the compound is used in the stripping bath by the action of the caustic alkali.

Preferably about 1.05 to 1.25 moles of polyamine are used for each mole of fatty acid. Mono- or di-glyceride esters may also be employed.

The alkylene groups in the polyamine may be substituted by one or more alkyl, aralkyl, aryl or alkaryl groups, such as methyl, ethyl, propyl, butyl, benzyl, phenyl, toluyl, xylyl or napthyl.

For commercial use these condensation products are usually mixed with water in such proportion that final composition contains from 20 to 60% of active ingredients.

The following examples may be given as to the preparation of the preferred condensation products according to the present invention:

Example I 284 parts of stearic acid are mixed with 225 parts of tetraethylene pentamine and the mixture is heated at 180° to 220° C. until the free fatty acid content of the mass is reduced to less than 1%. The resulting product is a soft amber colored waxy paste.

Example II 256 parts of palmitic acid and 210 parts of tetraethylene pentamine are mixed and heated at 180° to 220° C. until the free fatty acid content is less than 1%. The resulting product is an amber colored waxy paste.

Example III 265 parts of Japan wax are heated with 182 parts of triethylene tetramine to 180° C. and held at this temperature for 30 minutes. The temperature then is raised to 220° C. and held for 40 minutes at this temperature. The mixture is then quickly cooled to 70° C., and sufficient formic acid is added so that a 1% solution of the product has a pH of 7.5. The resulting product is a stringy yellow waxy paste.

Example IV 265 parts of palm oil fatty acids are heated with 200 parts of tetraethylene pentamine at 180° to 220° C. until the free fatty acid content of the mass is less than 0.5%. The resulting product is a light amber colored semi-solid waxy material.

Example V 228 parts of myristic acid is mixed with 155 parts of triethylene tetramine and heated at 180° to 220° C. until the free fatty acid content is under 1%. The resulting product is an amber colored waxy transparent gel.

The above compounds may be used for stripping cotton fabrics dyed with vat dyestuffs, taking the following as examples:

| | |
|---|---|
| Vat Blue | Color Index 1106 |
| Vat Blue | Color Index 1114 |
| Vat Green | Color Index 1101 |
| Vat Yellow | Color Index 1118 |
| Vat Red | Color Index 1212 |

The fabric to be stripped had been dyed with a 10% single paste of the vat dye based upon the weight of the cloth.

In the following examples, the various condensation products described above as used in actual stripping. In general, the following procedure was used: The bath ratio to the dyed cloth is maintained at 50 to 1. All percentages given below are based on the volume of bath. The stripping bath was started at a temperature of 140° F., and the temperature was raised to 185° F.

The bath was held at this temperature for 30 minutes. The material was then rinsed with hot water and dried.

Example VI

| | |
|---|---|
| Color—Vat Green | Color Index 1101 |
| Condensation product of Example 4 | 0.2% |
| Sodium hydrosulfite | 0.5% |
| Caustic soda | 1.0% |

In this case, the color was stripped down to a very pale green.

Example VII

| | |
|---|---|
| Color—Vat Blue | Color Index 1114 |
| Condensation product of Example 5 | 0.4% |
| Sodium hydrosulfite | 0.7% |
| Caustic soda | 1.0% |

The color was stripped down in this case, to a pale blue.

Example VIII

| | |
|---|---|
| Color—Vat Yellow | Color Index 1118 |
| Condensation product of Example 3 | 0.4% |
| Sodium hydrosulfite | 0.6% |
| Caustic soda | 1.0% |

The color in this case, was stripped down to a pale yellow.

Example IX

| | |
|---|---|
| Color—Vat Blue | Color Index 1106 |
| Condensation product of Example 1 | 0.5% |
| Sodium hydrosulfite | 0.8% |
| Caustic soda | 1.0% |

The color was stripped down to a light blue.

Example X

| | |
|---|---|
| Color—Vat Red | Color Index 1212 |
| Condensation product of Example 2 | 0.1% |
| Sodium hydrosulphite | 0.4% |
| Caustic soda | 0.5% |

The color in this case, was stripped down to a very pale pink.

The above results are not readily obtained where both terminal amine groups of the polyamine are condensed with fatty acid groupings of either high or low molecular weight. At least one terminal amine group should be in the free amine state and at least one should be in the amide state. Compounds in which both terminal amine groups are condensed with high molecular weight acids or in which one is condensed with a high and the other with a low molecular weight fatty acid are not as satisfactory as the condensation products described above.

The preferred condensation products of the present invention have the probable following general formula:

$$NH_2.(CH_2.CH_2.NH)_n.CH_2.CH_2NHCOR$$

whereas R is an alkyl group having 12 to 32 carbon atoms and where $n$ is 1 to 8. Preferably the R is an alkyl grouping of a fatty acid, said alkyl grouping having 14 to 18 carbon atoms and $n$ varies from 1 to 4. The saturated fatty acids are preferred to the unsaturated fatty acids, such as oleic erucic, or ricinoleic.

After preparation of the condensation product, it is generally preferred to neutralize all alkaline reacting —NH— and —NH$_2$ groups and render the aqueous medium containing the condensation product neutral by adding a low molecular weight carboxylic or fatty acid, such as acetic, lactic, formic or other water soluble organic acid. This neutralization results in simple salt-formation and does not involve amide formation.

It is generally desirable for storage and usage to mix the above condensates of Examples I to V with 40 to 80% and preferably 50 to 70% of water after neutralization with a low molecular weight carboxylic acid as described above. Generally the additional water is added incidental to cooling the product after the relatively high temperature condensation.

Generally in making up the stripping bath the condensation product, which serves as the stripping agent is pre-dissolved up in 5 to 10 parts of boiling water to give a 10 to 20% solution.

To summarize the stages in the storage and usage of the condensation product, these are (1) Dilution to 45 to 75% water content by weight with cold water and adjustment of pH to about 7 and (2) Pre-mixture with hot water having a temperature of 80 to 100° C. in amount of 5 to 10 parts by weight of water per part of product resulting from stage (1) to change stringy, pasty consistency to a free flowing product most effective in stripping bath and form a 10 to 20% solution of the condensation product.

As many changes could be made in the above baths for stripping vat-dyed cotton and rayon fabrics and agents or acids useful therein and many apparently widely different embodiments of this invention could be made without departing from the scope of the claims, it is intended that all matter contained in the above description shall be interpreted as illustrative and not in a limiting sense.

What is claimed is:

1. A stripping path for stripping vat dyestuffs from vat-dyed fabrics having sodium hydrosulfite and caustic soda in aqueous solution and also having a condensation product of a polyalkylene polyamine and a high molecular weight fatty acid, said assistant having the formula $$H_2N(CH_2.CH_2.NH)_mCH_2.CH_2.NHCOR$$

where $m$ is a numeral from 1 to 8 inclusive and where COR represents a high molecular weight fatty acid having from 12 to 32 carbon atoms.

2. A stripping bath for vat dyed fabrics containing about 0.4% to 0.8% of sodium hydrosulfite, about 1.0% of caustic soda and about 0.1% to 0.5% of a condensation product of a polyalkylene polyamine and a high molecular weight fatty acid, said assistant having the formula $$H_2N(CH_2.CH_2.NH)_mCH_2.CH_2.NHCOR$$

where $m$ is a numeral from 1 to 8 inclusive and where COR represents a high molecular weight fatty acid having from 12 to 32 carbon atoms.

ALTON A. COOK.
IRA SAPERS.

REFERENCES CITED

The following references are of record in the file of this patent:

UNITED STATES PATENTS

| Number | Name | Date |
|---|---|---|
| 1,947,951 | Neelmeier | Feb. 20, 1934 |
| 2,019,124 | Evans | Oct. 29, 1935 |
| 2,103,872 | Schoeller | Dec. 28, 1937 |
| 2,112,567 | Havas | Mar. 29, 1938 |
| 2,132,388 | Berchet | Oct. 11, 1938 |
| 2,155,135 | Kartaschoff | Apr. 18, 1939 |
| 2,201,041 | Katz | May 14, 1940 |
| 2,243,329 | De Groote | May 27, 1941 |
| 2,243,980 | Rheiner | June 3, 1941 |
| 2,290,154 | Blair | July 21, 1942 |
| 2,291,396 | Lieber | July 28, 1942 |
| 2,345,632 | Robinson | Apr. 4, 1944 |